United States Patent
Cerasi et al.

(10) Patent No.: US 7,461,482 B2
(45) Date of Patent: Dec. 9, 2008

(54) SUB-FLOORING ASSEMBLY AND METHOD

(76) Inventors: Mark A. Cerasi, 172 Avon Bend Road, Charlestown, WV (US) 25414; David Kubic, 150 Avon Bend Rd., Charlestown, WV (US) 25414

( * ) Notice: Subject to any disclaimer, the term of this patent is extended or adjusted under 35 U.S.C. 154(b) by 440 days.

(21) Appl. No.: 11/104,653

(22) Filed: Apr. 13, 2005

(65) Prior Publication Data

US 2006/0254182 A1    Nov. 16, 2006

(51) Int. Cl.
    E04F 15/00    (2006.01)
(52) U.S. Cl. .................. 52/177; 62/584.1; 62/582.2; 62/589.1
(58) Field of Classification Search ............. 52/584.1, 52/582.2, 592.1, 177, 263, 220.5, 126.2, 52/592.2, 590.2, 126.5, 126.6, 588.1, 586.1, 52/589.1, 591.1, 630, 801.1, 127.11
    See application file for complete search history.

(56) References Cited

U.S. PATENT DOCUMENTS

| | | | | |
|---|---|---|---|---|
| 4,057,948 A | * | 11/1977 | Wise | 52/584.1 |
| 4,538,392 A | | 9/1985 | Hamar et al. | |
| 4,566,243 A | * | 1/1986 | Dahlin | 52/584 |
| 5,022,200 A | * | 6/1991 | Wilson et al. | 52/127.9 |
| 5,024,036 A | | 6/1991 | Johnson | |
| 5,090,169 A | * | 2/1992 | Takeda et al. | 52/220.3 |
| 5,155,960 A | * | 10/1992 | Shaanan | 52/584.1 |
| 5,157,890 A | * | 10/1992 | Jines | 52/582.1 |
| 5,424,118 A | * | 6/1995 | McLaughlin | 428/314.8 |
| 5,630,304 A | * | 5/1997 | Austin | 52/384 |
| 5,694,729 A | * | 12/1997 | Blackburn et al. | 52/582.2 |
| 5,743,056 A | * | 4/1998 | Balla-Goddard et al. | 52/309.11 |
| 5,862,643 A | | 1/1999 | Schilham | |
| 6,032,427 A | | 3/2000 | Randjelovic | |
| 6,089,784 A | | 7/2000 | Ardern | |
| 6,128,881 A | * | 10/2000 | Bue et al. | 52/582.2 |
| 6,148,569 A | * | 11/2000 | Giovannetti | 52/127.11 |
| 6,173,548 B1 | | 1/2001 | Hamar et al. | |
| 6,189,283 B1 | * | 2/2001 | Bentley et al. | 52/587.1 |
| 6,244,008 B1 | | 6/2001 | Miller | |
| 6,508,037 B1 | * | 1/2003 | Owen | 52/220.1 |

FOREIGN PATENT DOCUMENTS

EP    0 652 340    5/1995

* cited by examiner

*Primary Examiner*—Brian Glessner
*Assistant Examiner*—Christopher J Darner
(74) *Attorney, Agent, or Firm*—William C. Schrot

(57) ABSTRACT

The present invention is directed to a sub-flooring assembly. The disclosed assembly includes at least two rectangular sections. Each of the sections have first and second ends and first and second sides. A male component extends outwardly from the first end of each of the sections. The male component has a flange proximate a free end thereof. An opening is disposed on the second end of each of the sections. The opening extends into the section to form a cavity. A pocket is formed in the cavity. The flange of one of the sections is removably received in the pocket of another of the sections for detachably securing the first end of one of the sections to the second end of another of the sections.

15 Claims, 16 Drawing Sheets

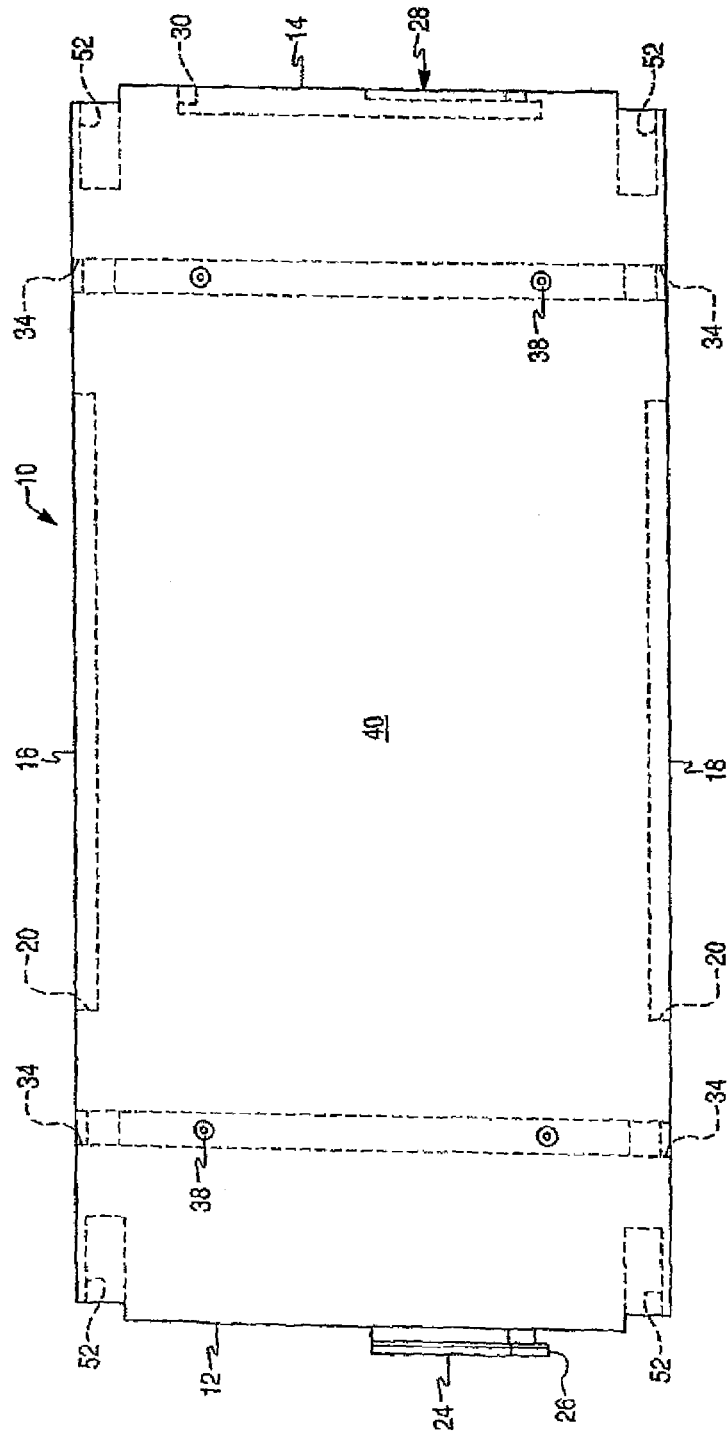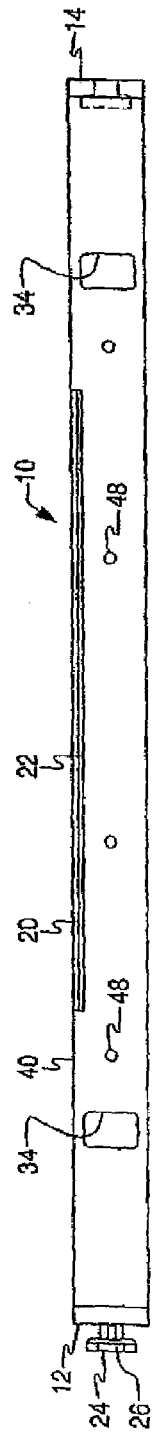

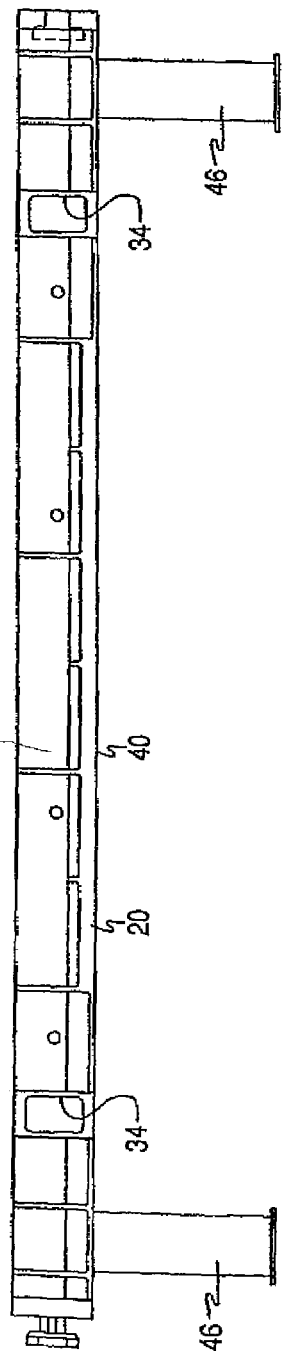
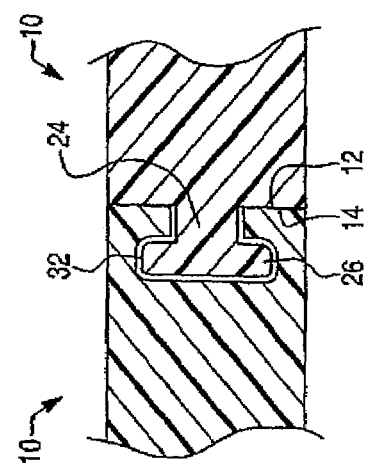

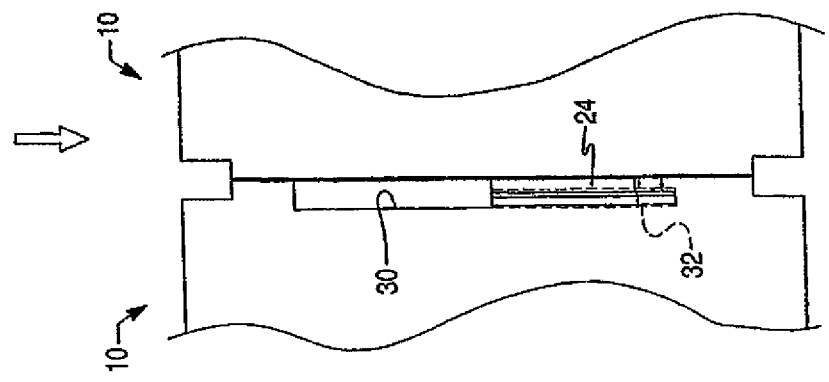
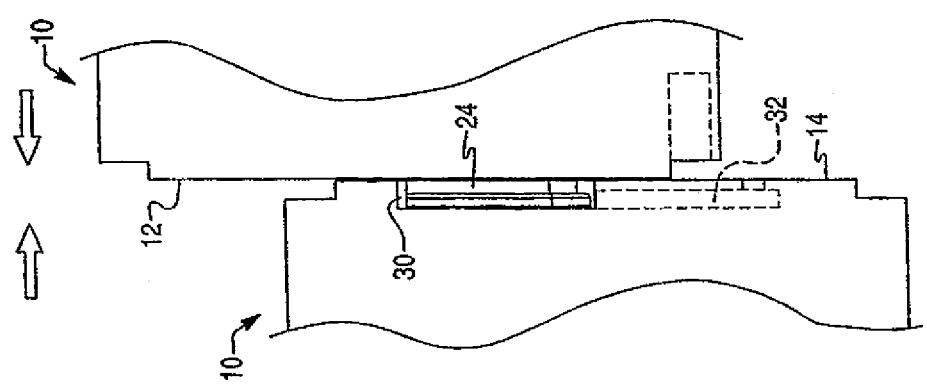
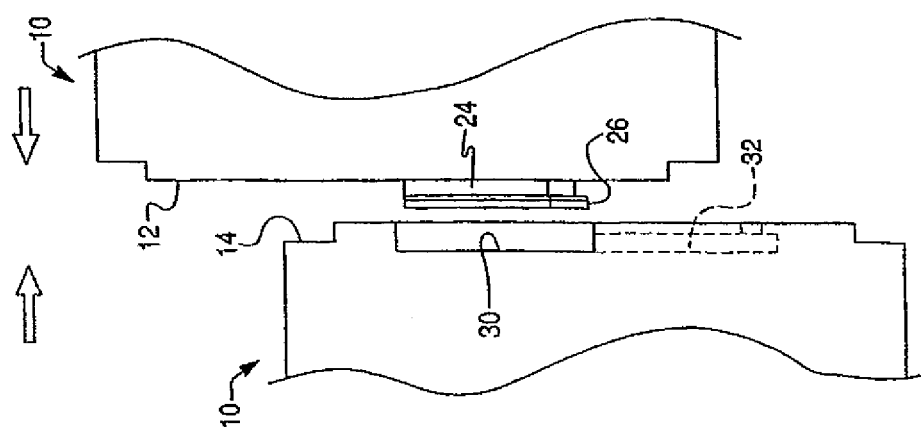

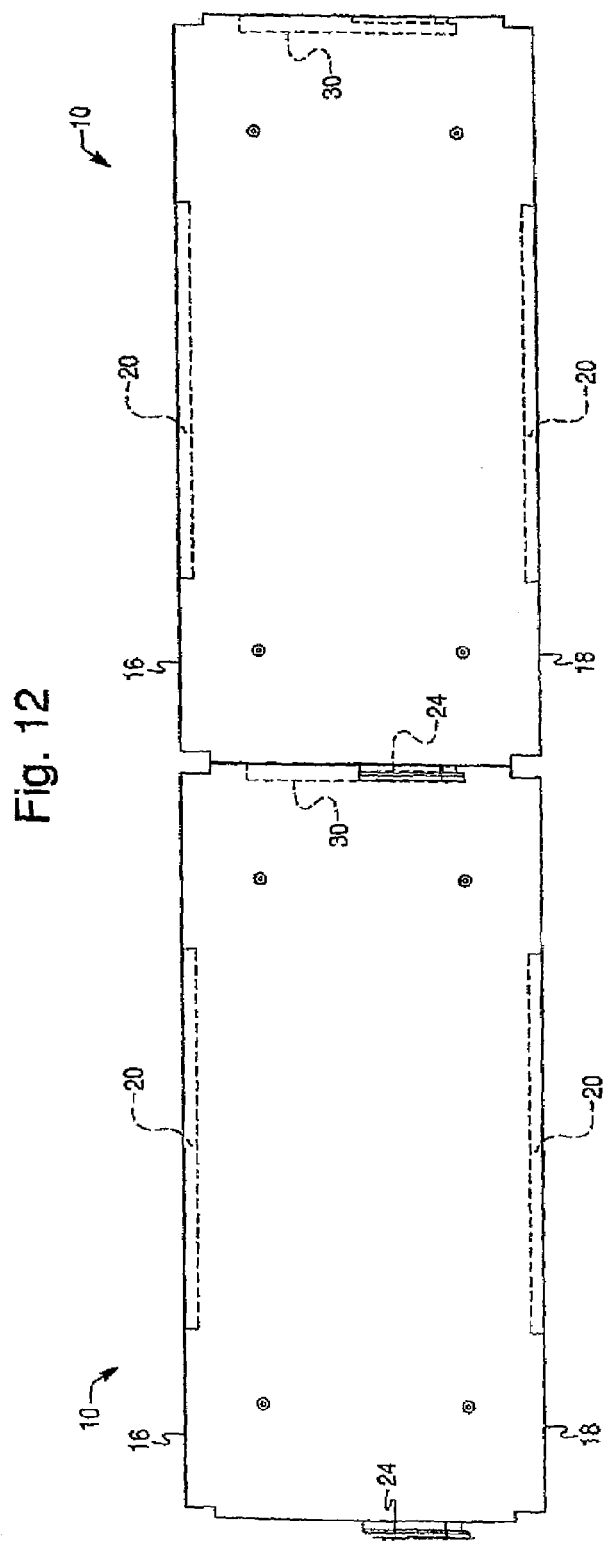

SUB-FLOORING ASSEMBLY AND METHOD

FIELD OF THE INVENTION

The present invention is directed to a sub-flooring assembly. The disclosed assembly includes at least two rectangular sections. Each of the sections have first and second ends and first and second sides. A male component extends outwardly from the first end of each of the sections. The male component has a flange proximate a free end thereof. An opening is disposed on the second end of each of the sections. The opening extends into the section to form a cavity. A pocket is formed in the cavity. The flange of one of the sections is removably received in the pocket of another of the sections for detachably securing the first end of one of the sections to the second end of another of the sections.

BACKGROUND OF THE INVENTION

Various conventional temporary sub-flooring designs are known. Stringer sub-floors include wooden strips 2'×8' or 2'×6'. The strips are spaced two feet apart, and covered with sheets of plywood which are secured to the strips with screws. Assembly of stringer sub-floors is relatively slow and labor intensive. Metal sub-frame type floors have a wood exterior surface with 4'×4' pre-constructed sections. The sections may be secured to each other using fasteners. Metal sub-frame floors are also relatively difficult and labor intensive to assembly. In addition, the sections typically include protrusions, or 'leg sleeves', which are difficult to stack and ship. A web-lock floor system is made of wood with thin gauge steel strips underneath. The sections lock in place by a tongue and groove method. Web-lock flooring is typically laid directly onto a relatively flat, secure surface, such as concrete, and is often used for flooring required in sporting events. As such, conventional web-lock flooring provides poor load capacity and is not overly rugged.

Many conventional flooring designs are not weather resistant, give they often include wood components or sections. Such flooring designs are therefore subject to rotting, which could result in weak spots or render the flooring unusable. Thus, many conventional flooring designs cannot be reused, or may only be reused a relatively limited number of times, particularly if they are used for outdoor applications.

Therefore, there is a need for a sub-flooring assembly that solves some or all of the above noted problems.

SUMMARY OF THE INVENTION

The present invention is directed to a temporary sub-flooring assembly and more particularly to a load bearing temporary sub-flooring assembly which has interlocking sections. The disclosed sub-flooring is sturdy and has excellent load bearing characteristics, and can support the weight of vehicles and other heavy objects. The sub-flooring is easily and rapidly assembled into any desired size and shape, and may be easily aligned and releasably locked together. The system is cost effective, and easily stackable for ease of storage and transport. The disclosed flooring may be easily disassembled, and the sections reused.

The present invention is directed to a sub-flooring assembly. The disclosed assembly includes at least two rectangular sections. Each of the sections have first and second ends and first and second sides. A male component extends outwardly from the first end of each of the sections. The male component has a flange proximate a free end thereof An opening is disposed on the second end of each of the sections. The opening extends into the section to form a cavity. A pocket is formed in the cavity. The flange of one of the sections is removably received in the pocket of another of the sections for detachably securing the first end of one of the sections to the second end of another of the sections.

The present invention also relates to a cam lock having a cylindrical body, a head portion, and an L-shaped arm. The body has first and second ends, and a first diameter. The head portion extends outwardly from the first end. The head portion is axially aligned with the body, and has a second diameter less than the first diameter. The arm has a first leg extending outwardly from and substantially perpendicular to the second end and a second leg substantially parallel to the body.

A method of assembling a temporary flooring assembly is also disclosed. A plurality of rectangular sections are provided. Each of the sections has first and second ends and first and second sides, with a keying means extending from the first end and a locking means formed in the second end. A pair of slots are formed in the respective first and second sides of each section. A cam lock is rotatably secured proximate the first side adjacent the first side slot. The cam lock has an arm pivotally moveable through the first side slot. The first side of one of the sections is aligned with the second side of another of the sections so that the slots are aligned. The cam lock is pivoted so that the arm passes through the first side slot and into the second side slot, thereby securing the first and second sides together.

BRIEF DESCRIPTION OF THE FIGURES

FIG. 1 is a plan view of a top surface of a section according to a first embodiment of the present invention;

FIG. 2 is an elevational side view of the section according to the first embodiment;

FIG. 6 is a another elevational side view of the section according to the first embodiment;

FIG. 8 is a fragmentary plan view showing two sections to be joined end-to-end;

FIG. 9 is a fragmentary plan view showing the keying means of one section received in the cavity of another section;

FIG. 10 is a fragmentary plan view showing two joined sections with the keying means disposed in the pocket of the locking means;

FIG. 11 is a fragmentary cross-sectional view of two joined sections showing the keying means and locking means;

FIG. 12 is a plan view showing two sections joined end-to-end, with receiver channels and keying and locking means shown in phantom;

DETAILED DESCRIPTION OF THE INVENTION

Figure 4:
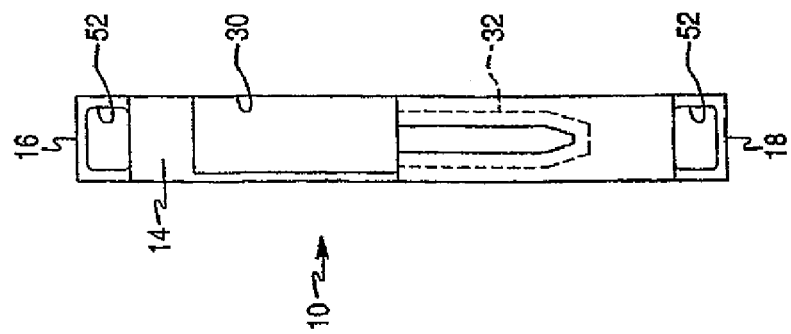
FIG. 4 is an elevational view of a second end of the section according to the first embodiment.

Referring to FIGS. 1-7, a sub-flooring assembly according to a first embodiment includes a plurality of sections 10 which are joined together end-to-end and side-to-side to form an assembly of any desired dimensions. The assembly may be easily disassembled to the individual sections when no longer needed. Preferably each section is rectangular having a first end 12, an opposite second end 14, a first side 16 and an opposite second side 18. It is preferred that the length of each end 12, 14 is about 2 feet and the length of each side 16, 18 is about 4 feet. However, the specific dimension of each section 10 is not so limited. For custom assemblies, sections of different dimensions may be used. Preferably, each section 10 has a height of 3 inches, but the invention is not so limited.

A receiver channel 20 is formed longitudinally on each side of each section 10. A rigid insert 22 is disposed in each receiver slot 20 to provide support to the section, to reduce flexibility of the section, and to connect the sides of adjacent sections. The receiver channel 20 may be approximately 9/64 inches high, 3/4 inches deep and 24 1/4 inches long. However, it should be understood that the disclosed dimensions of receiver channel 20 are exemplary. Rigid insert 22 preferably is a flat metal rod approximately 1 inch wide, 24 inches long, and 1/8 inch thick to be easily received and retained in the receiver channel 20.

A keying means 24 is formed on the first end 12 of each section 10. The keying means 24 preferably is a male prong 26 with an angled forward end which is disposed on the first end 12 of the section, preferably closer to the second side 18 than the first side 16. The keying means 24 extends outwardly from the first end 12 and the male prong 26 is approximately parallel to the first end 12. Preferably, the male prong 26 has a T-shape. However, male prong may have other configurations, such as an elongated portion with a ball at the free end thereof. Other types of keying means known to persons skilled in the art may be used, such as an elongate protrusion with a flange at a free end thereof. The invention is not limited to the keying means disclosed herein.

A locking means 28 is formed on the second end 14 of each section 10. Preferably, the locking means is an elongated cavity 30 oriented between the first and second sides 16, 18 and preferably disposed closer to the second side 18. A pocket 32 is formed in the cavity 30 proximate to the second side 18 of the section 10. The pocket 32 may have a T-shape to cooperate with the T-shape of the male prong 26 as will be described below. Other locking means known to persons skilled in the art may be used. The invention is not limited to the locking means disclosed herein.

Figure 1A:
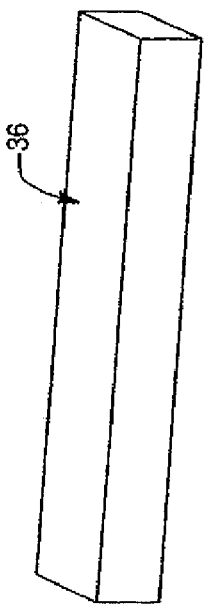
FIG. 1A is a perspective view of a brace.
Figure 7:
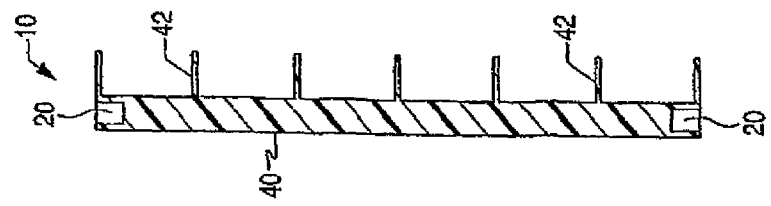
FIG. 7 is a cross-sectional view of the section of FIG. 5 taken along line 7-7 and view in the direction of the arrows.

A pair of spaced-apart slots 34 may be provided, which extend substantially perpendicular to the respective first side 16 and second side 18 of each section 10. Each slot may be approximately 2 1/8 inches high and 1 1/4 inches wide. A brace 36, preferably a rectangular metal brace as best shown in FIG. 1A, may be received in each slot 34. As such, brace 36 may be approximately 2 inches high by 1 inch wide, so that it may be easily slipped through slot 34. Each brace 36 has a length such that each brace 36 is received within each slot 34, and extends perpendicularly outwardly from each slot 34 of the respective first side 16 and second side 18. When a plurality of sections are assembled and aligned side-by-side, slots 34 on first side 16 of one of the sections is aligned with slots 34 on second side 18 of another section. Braces 36 are received in corresponding slots 34 in the respective first side 16 and second side 18 of adjacent section 10, thereby adjoining the adjacent sections. Thus, an assembly of a desired width may be easily formed.

Each brace 36 may be fastened within the respective slot 34 in each section using fasteners, such as screws, bolts, pins, and the like. In a preferred embodiment, a separate bore 38 is formed in the upper surface of each section 10 aligned with each slot 34. A screw or other fastening means is placed in the respective bore 38 and into the brace 36 directly below the respective bore 38. In this manner each brace 36 is secured to the respective section 10 and movement between adjacent sections 10 is minimized.

Each section 10 preferably includes a planar upper surface 40 and a plurality of intersecting struts 42 formed beneath the upper surface 40. The intersecting struts 42 provide structural strength to the section. In addition, the section is relatively light weight. The intersecting struts 42 may form a grid or honeycomb pattern. In a preferred embodiment the struts 42 are disposed to form 4 inch squares on the underside of each section.

Preferably, the upper surface has a thickness of approximately 3/16 inch. Each strut 42 has a thickness of about 3/16 to about 1/4 inch. The sections are preferably formed from HTP structural foam. The sections may also be formed from fiberglass reinforced polypropylene plastic, other polymer materials or polymer fiber composites, lightweight metal, or some other suitable material. It should be understood that the precise spacing and pattern of struts 42, as well as the thickness of struts 42 and planar upper surface 40, may vary depending on the material used to form section 10. However, struts 42 should have a sufficient thickness, spacing, and pattern to provide the desired rigidity to section 10. Likewise, planar upper surface 40 should have a sufficient thickness to provide the desired rigidity to section 10.

A well 44 is preferably formed proximate each corner C on the underside of each section 10. A respective leg 46 may be received in each well, which supports the section at a desired height above the surface on which the assembly is set up. A metal insert or liner may also be provided in each well 44, which receives the leg 46. This assembly may be set up in a building on an existing floor or it may be used in the outdoors on paved surfaces or on natural terrain with excellent load bearing qualities. If the upper surface 40 is desired to be perfectly level, legs 46 of varying heights may be inserted into the respective wells 44 to accommodate any sloping or irregularly contoured under surfaces. Legs 46 may be formed from rectangular metallic stock. Each leg 46 may have a plurality of openings formed vertically in one face of the leg 46. A pin may be inserted into a selected opening and received in an opening in the well 44 to provide a means for locking the leg 46 at a desired extension from the well 44.

The present invention is also directed to a method of assembling the disclosed sub-flooring assembly. First end 12 of one section 10 is disposed adjacent second end 14 of another section 10, with the keying means 24 on one section 10 aligned with the cavity 30 on the adjacent section 10, as best shown in FIG. 8. The two sections are moved toward one another so that the male prong 26 is received in the cavity 30, as best shown in FIG. 9. The sections are moved laterally with respect to one another such that the male prong 26 is received in the pocket 32, as best shown in FIG. 10. The T-shaped male prong 26 is received within the larger T-shaped pocket 32 in a manner so that vertical and sideway movement is restricted, as best shown in FIG. 11. The first end 12 of the one section 10 abuts the second end 14 of the other section 10.

When ends 12, 14 of the two sections 10 are joined, the first sides 16 of both sections 10 are aligned and coplanar, as best shown in FIG. 12. Likewise, the second sides 18 of both sections 10 are directly aligned and coplanar. This end-to-end joining of sections 10 is repeated to provide an assembly having a desired length.

Figure 13:
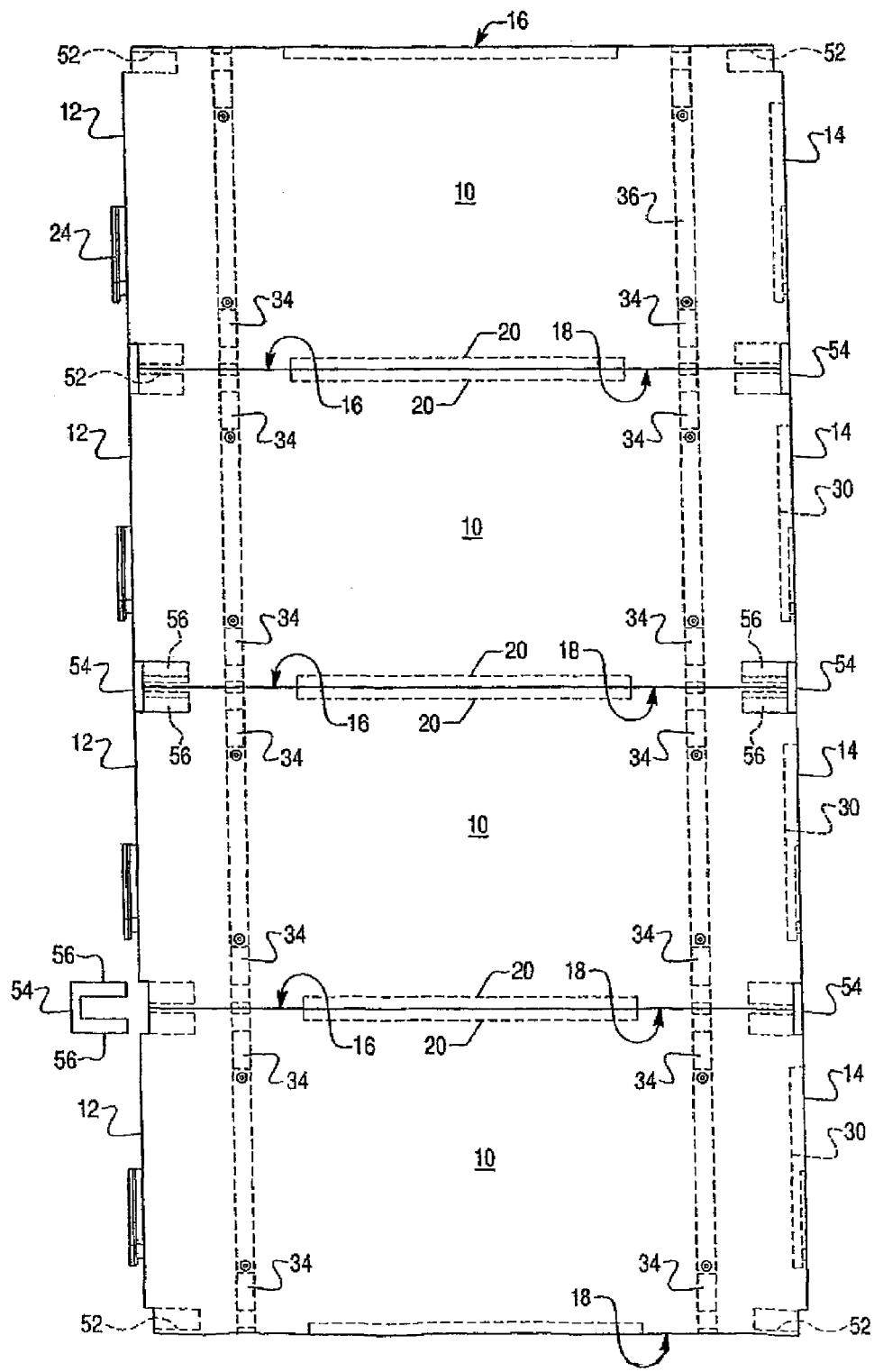
FIG. 13 is a plan view showing four sections joined side-by-side, with receiver channels, locking means, slots and openings shown in phantom.

Sections 10 may also be joined side-by-side, as best shown in FIG. 13. Sections 10 are disposed side-by-side, with first side 16 of one section 10 adjacent second side 18 of another section 10. Sections 10 are aligned side-by-side so that ends 12, 14 of the sections 10 being joined are aligned and coplanar. Rigid inserts 22 are received in the respective receiver channels 20 in the sides of the sections 10 being joined. The rigid insert 22 is wider than the depth of the receiver channel 20 and extends outwardly from the receiver channel 20 in the one section. The extending portion of the rigid insert 22 is received in the receiver channel 20 of the adjacent side-by-side section 10 and the sections are moved to abut one another with the rigid insert 22 being fully received in the cooperating adjacent receiver channels 20.

The respective slots 34 in the adjacent side-by-side sections are aligned in parallel rows. Braces 36 are disposed in the rows of slots 34 to provide rigidity to the panel, and also to join the adjacent sections 10 together. A brace 36 may also extend through a plurality of slots aligned together. For example, a brace 36 having a length of approximately 90-96 inches may be inserted through slots 34 to support four side-by-side sections. A panel measuring 4'×8' may be formed for ease of handling and for increased versatility. However, other dimensions may be used. In order to further secure each section 10 to the respective brace 34, a screw or fastening means may be disposed in each bore 38 in the upper surface 40 of each section 10, which is connected to the brace 34 and aligned directly beneath the respective bores 38.

Figure 14:
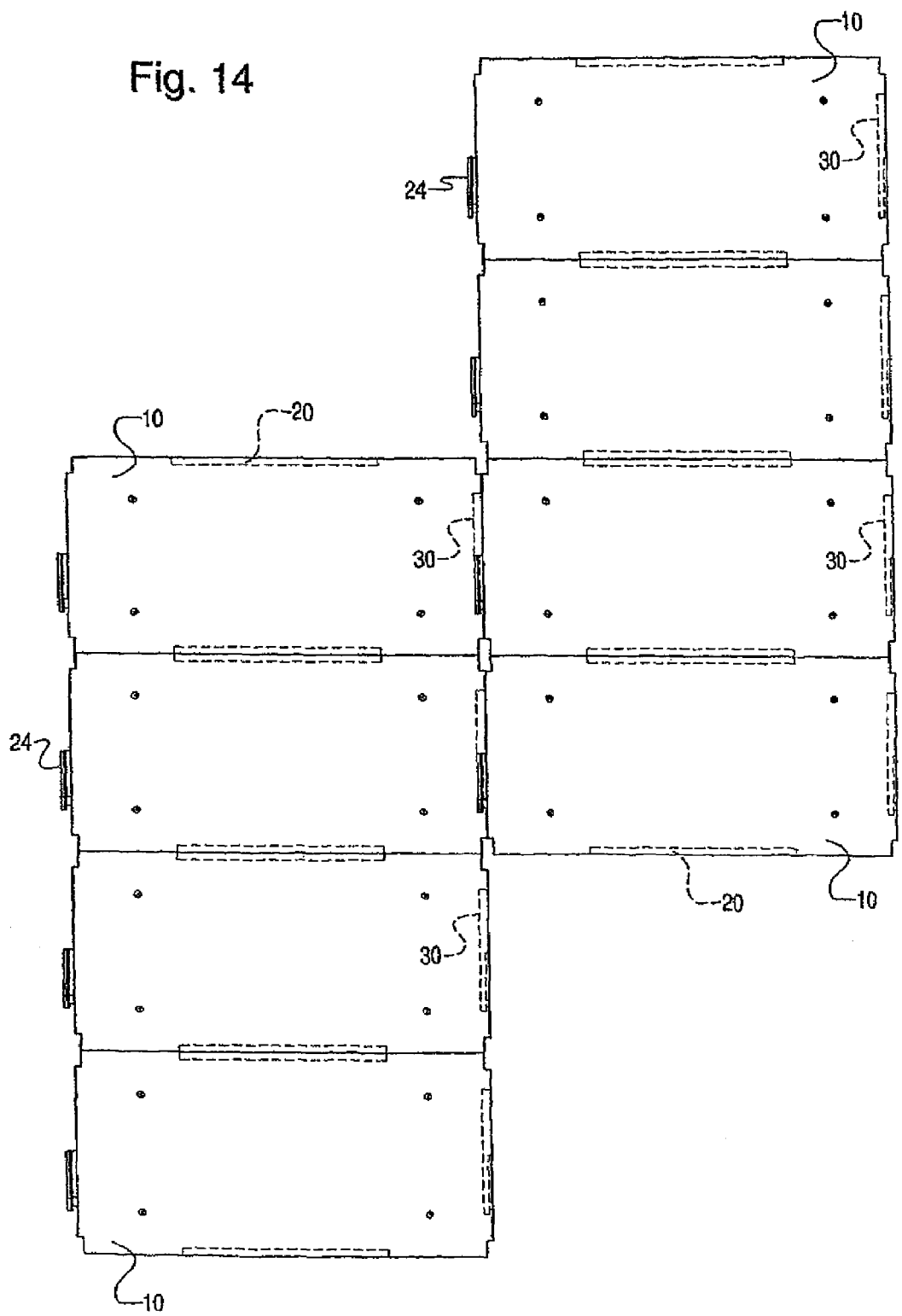
FIG. 14 is a plan view showing joined sections, with receiver channels and locking means shown in phantom.

This side-by-side assembly is repeated until a desired number of sections 10 are joined to form a panel having the desired dimension. The first ends 12 of sections 10 joined side-by-side may be joined with the second ends 14 of another group of sections 10 joined side-by-side, as best shown in FIG. 14. When so assembled, the sections 10 are oriented with the respective keying means 24 being aligned and coplanar, and all of the respective cavities 30 are aligned and coplanar in a plane parallel with the plane on which the keying means 24 lie. The spaced-apart slots 34 in the sides of the adjacent sections are also in alignment forming two parallel rows of slots.

Two panels formed from a plurality of joined sections may be placed end-to-end so that the keying means 24 on one of the panels engages the locking means 28 on the other panel. For example, the two panels may be interconnected to form an 8'×8' assembly. Alternatively, the ends 12 of some of the sections 10 may be joined with the ends 14 of some of the sections 10, as best shown in FIG. 14. Thus, two panels may be joined in an offset configuration. Various flooring configurations may be easily assembled. In order to disassemble the flooring assembly, the reverse of the above procedure is followed.

It should be understood that any number of sections 10 may be joined end-to-end and/or side-by-side in order to provide an assembly having the desired dimensions. The assembly is not restricted to square or rectangular configurations but may have irregular shapes. Although sections having 2'×4' are described above, tile sections may be formed having any dimensions desired.

Figure 15:
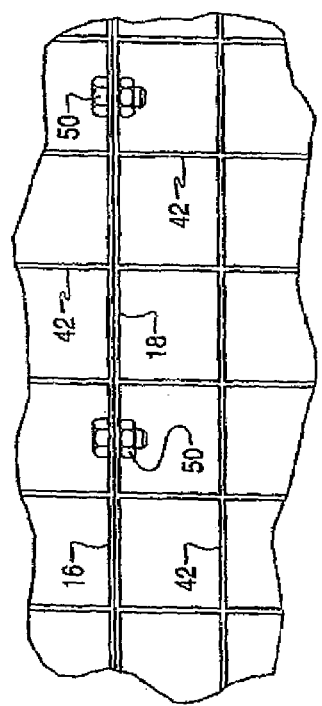
FIG. 15 is a fragmentary plan view of the bottom surface of two sections bolted together.
Figure 16:
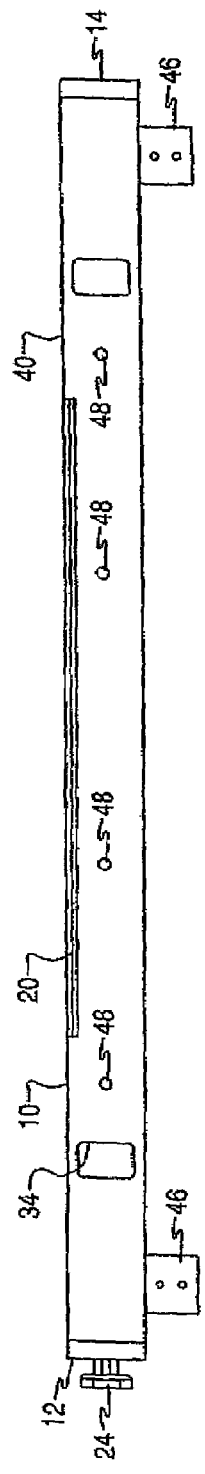
FIG. 16 is another elevational side view of the section according to the first embodiment with legs attached to the bottom surface.

The opposite sides 16, 18 of each section preferably include a plurality of spaced-apart bolt holes 48 formed therein, as best shown in FIGS. 15-16. When sections 10 are abutting in a side-by-side relation, bolts and fasteners 50 may be received in the bolt holes 48 to further secure the sections to one another and to reduce any possible movement between the adjacent sections. The sections may be inverted during assembly to facilitate installation of the bolt and fasteners 50.

Figure 3:
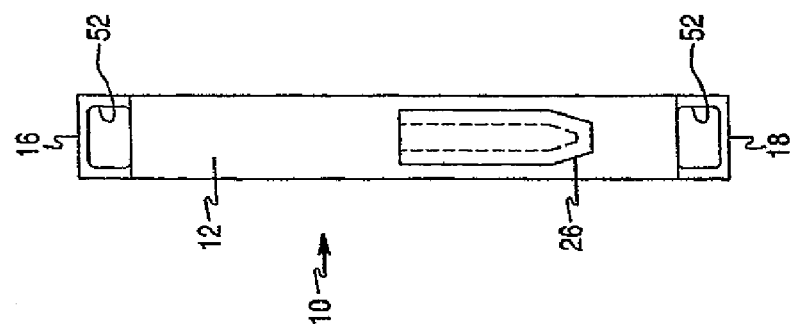
FIG. 3 is an elevational view of a first end of the section according to the first embodiment.
Figure 5:
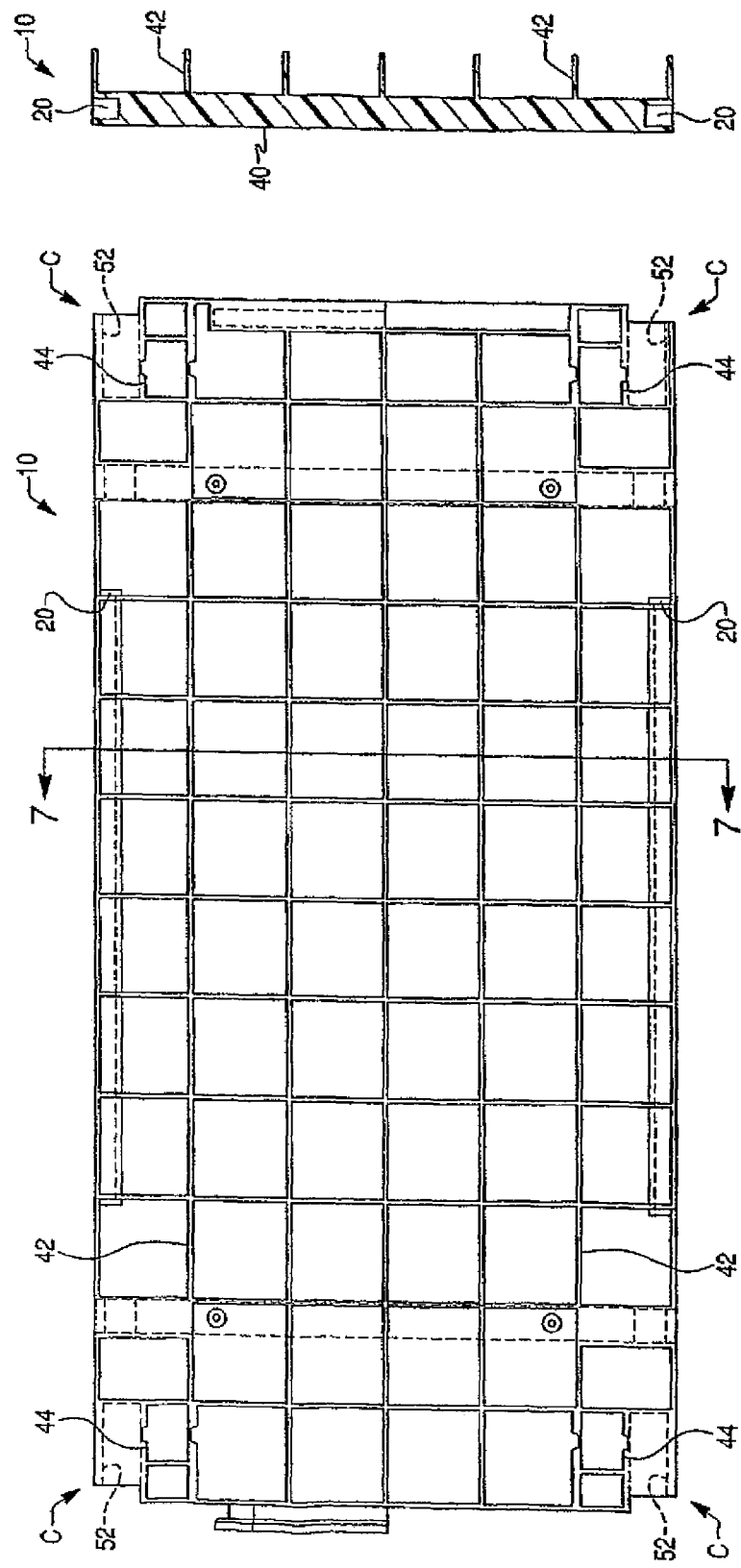
FIG. 5 is a plan view of a bottom surface of the section according to the first embodiment.

It is further preferred that an opening 52 be formed in each opposite end 12,14 of each section 10, as best shown in FIGS. 3 and 4. The openings 52 are proximate the corners C of each respective section 10, with four such openings 52 in each rectangular section 10, as best shown in FIG. 5. When the sections 10 are disposed side-by-side, the openings 52 in the respective sections are adjacent to one another. A connector 54, preferably U-shaped, may be disposed in the openings 52 of the adjacent sections, as best shown in FIG. 13. The connector 54 has bifurcated arms 56 with one arm being received in the opening 52 in one section and the other arm being received in the opening 52 in the adjacent section. A plurality of connectors 54 may be disposed in the side-by-side sections 10 to further assist retaining the adjacent sections 10 in their side-by-side disposition.

Figure 17:
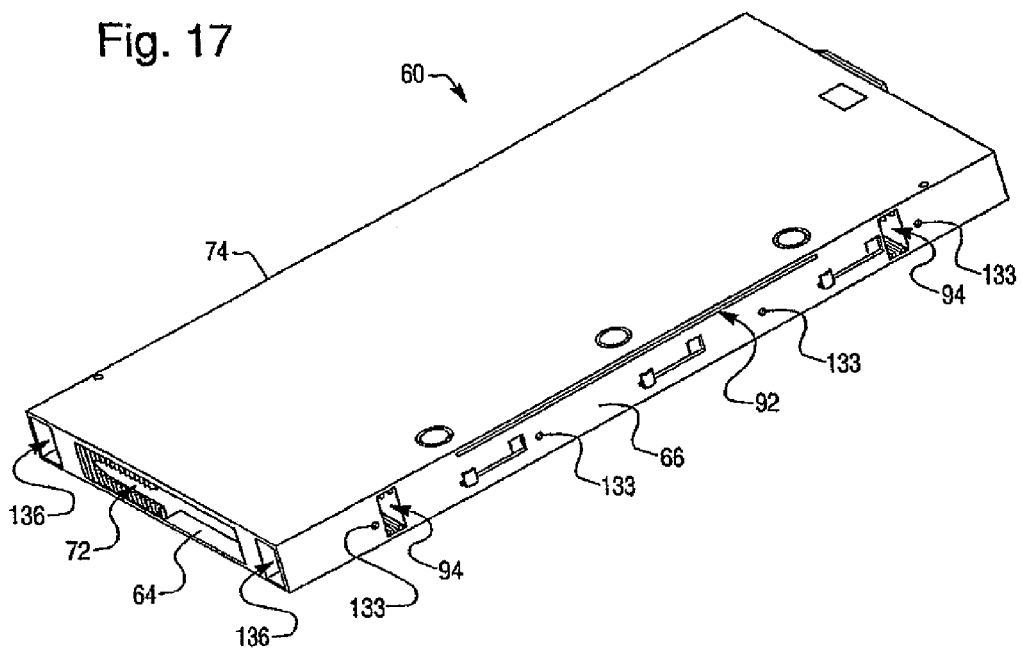
FIG. 17 is a perspective view of a panel according to a second embodiment.
Figure 18:
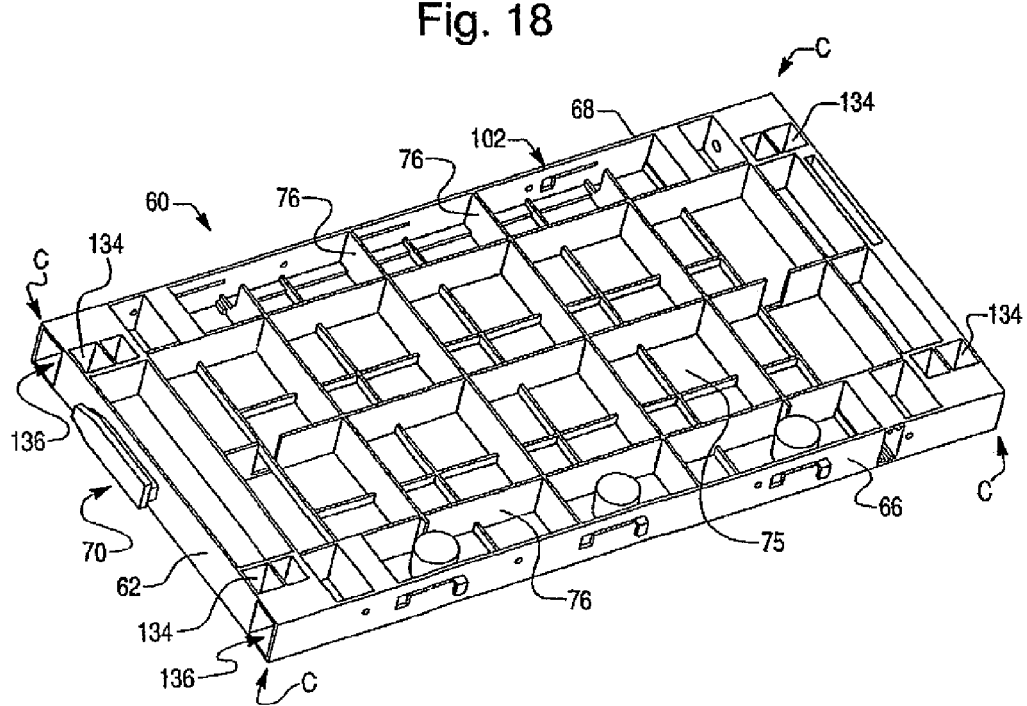
FIG. 18 is another perspective view of the panel according to the second embodiment.
Figure 19:
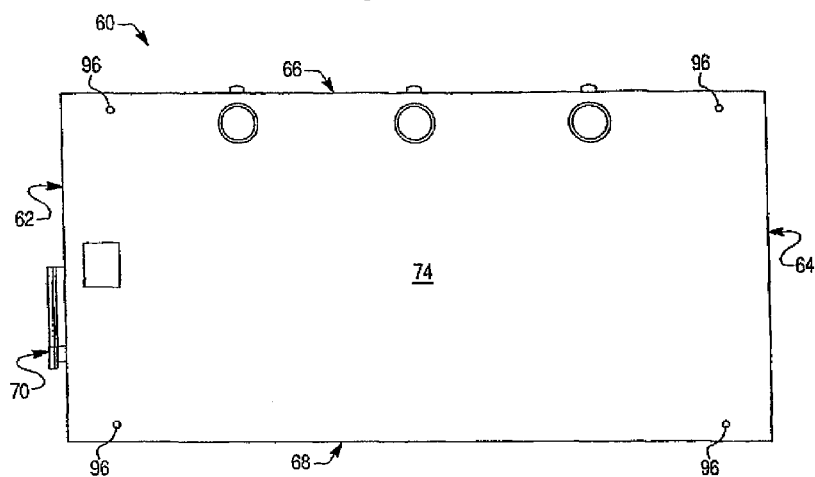
FIG. 19 is a top plan view of the panel according to the second embodiment.
Figure 20:
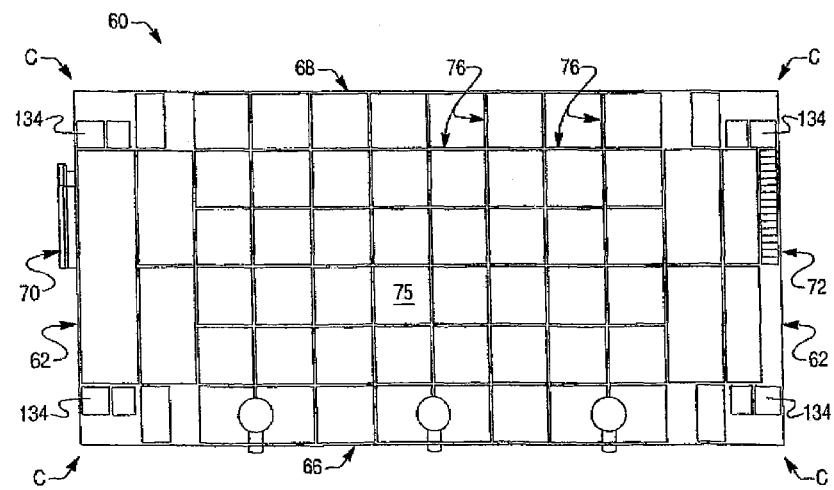
FIG. 20 is a bottom plan view of the panel according to the second embodiment.

A sub-flooring panel 60 according to a second embodiment is best shown in FIGS. 17-20. Panel 60 preferably has a rectangular configuration with first and second ends 62, 64 and first and second sides 66, 68. Similar to the first embodiment, panel 60 includes a male component 70 disposed on first end 62, and an opening 72 disposed on second end 64. Panel 60 preferably includes a substantially planar top surface 74, as best shown in FIGS. 17 and 19. As best shown in FIGS. 18 and 20, a bottom surface 75 preferably includes a plurality of support struts 76. Support struts 76 are preferably disposed in a grid or honeycomb pattern. Support struts 76 preferably have a height equal to or less than the height of ends 62, 64 and sides 66, 68. However, it should be understood that support struts 76 may have a uniform height, and be uniformly spaced. Alternatively, support struts 76 may have variable heights, and be spaced non-uniformly or in a pattern.

It should also be understood that the precise spacing and pattern of support struts 76, as well as the thickness of support struts 76, may vary depending on the material from which panel 60 is formed. However, support struts 76 should have a sufficient thickness, spacing, and pattern to provide the desired rigidity to panel 60. Likewise, the thickness between planar top surface 74 and bottom surface 75 may vary depending on the material used to form panel 60, but the thickness between planar top surface 74 and bottom surface 75 should be sufficient to provide the desired rigidity to panel 60.

Figure 21:
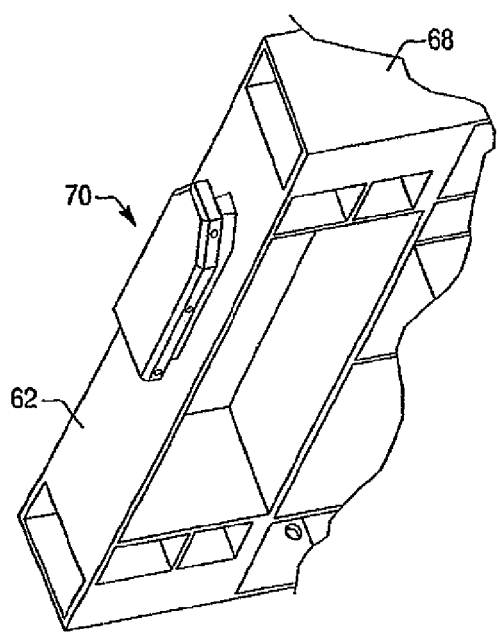
FIG. 21 is a fragmentary perspective view of a first end of the panel according to the second embodiment showing a male component disposed thereon.
Figure 22:
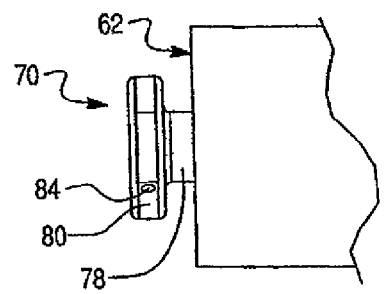
FIG. 22 is an elevational side view of the end of the panel shown in FIG. 21.
Figure 23:
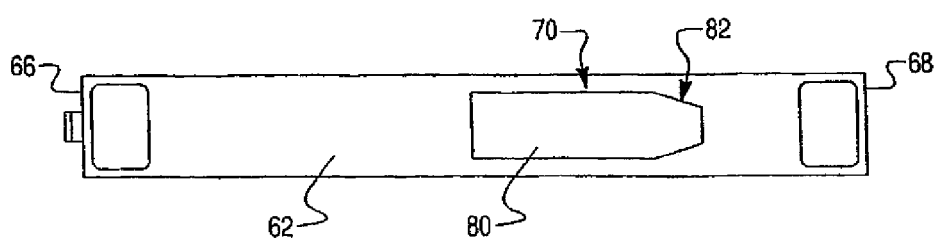
FIG. 23 is an elevational view of the end of the panel shown in FIG. 21.

As best shown in FIGS. 21-23, male component 70 includes a stem 78 attached to first end 62, and an outermost flange 80 attached to stem 78. Preferably, flange 80 has a length greater than the length of stem 78, with an angled tip 82 extending outwardly from stem 78 toward second side 68. Male component 70 may be integrally formed with panel 60, or secured to first end 62 using fasteners, adhesive or the like. Male component 70 is preferably formed from a polymer material. Holes 84 may be formed in male component 70, such as during the molding process, to minimize the chance of any internal air bubbles forming within male component 70 which could adversely affect its structural integrity. Male component 70 may be T-shaped in cross-section, as best shown in FIG. 22. Alternatively, male-component 70 may include a ball or other flange having a diameter greater than the diameter of stem 78. Preferably, male component 70 is disposed on first end 62 closer to second side 68 than to first side 66, as best shown in FIG. 23.

Figure 24:
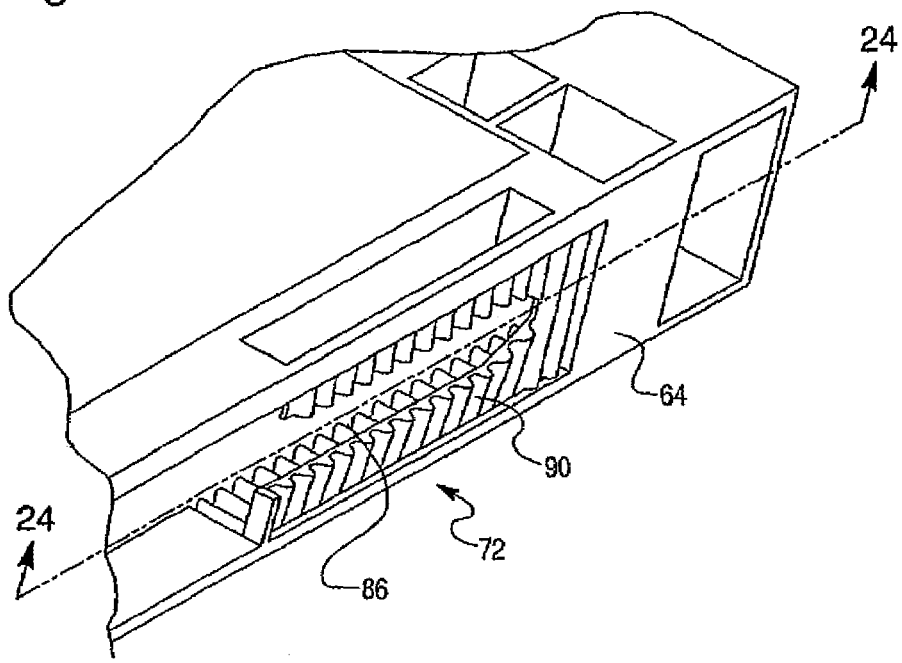
FIG. 24 is a fragmentary perspective view of a second end of the panel according to the second embodiment showing an opening disposed thereon.
Figure 25:
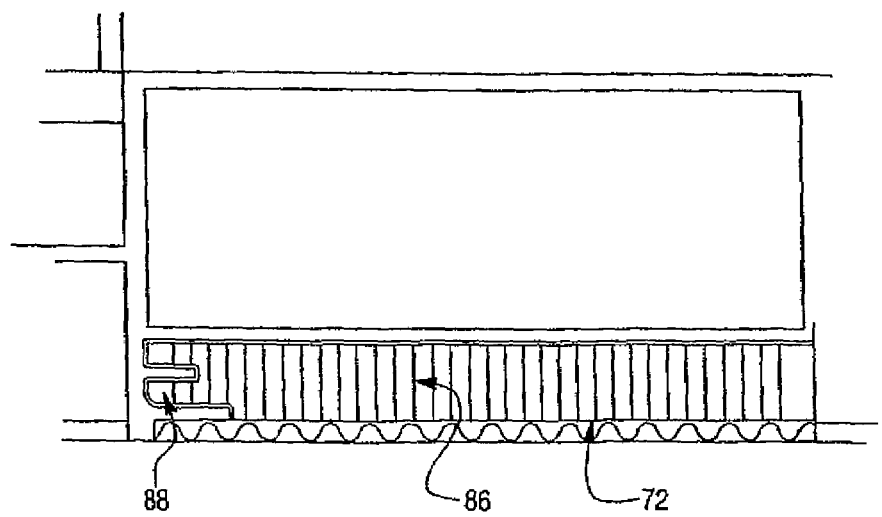
FIG. 25 is a fragmentary cross-sectional view of the panel shown in FIG. 24 taken along line 25-25 and viewed in the direction of the arrows.

As best shown in FIGS. 24-25, opening 72 extends into second end 64 to form a cavity 86. A pocket 88 is formed in cavity 86, as best shown in FIG. 25. Opening 72 is configured so that male component 70 of one panel 60 may be inserted therein. Thus, first end 62 of one panel 60 abuts second end 64 of another panel 60, as described above for the first embodiment. Pocket 88 is configured to receive angled tip 82 therein. Thus, pocket 88 preferably includes angled walls complimentary to angled tip 82, so that angled tip 82 fits snugly within pocket 88. Cavity 86 preferably includes a plurality of spaced teeth 90 or ridges against which flange 80 may be slid.

Cavity 86 and pocket 88 have a length greater than the length of opening 72. In addition, flange 80 and tip 82 have a length greater than the length of stem 78. When joining two panels 60 together end-to-end, male component 70 is aligned with and inserted through opening 72 so that flange 80 is disposed within cavity 86. When male component 70 is initially aligned with opening 72, sides 66, 68 of the two panels 60 are offset (similar to sides 16, 18 of the sections shown in FIG. 9). The two panels 60 are then moved laterally with respect to one another so that tip 82 slides into pocket 88. Given opening 72 does not extend into pocket 88, male component 70 is secured within cavity 86 when tip 82 is received in pocket 88.

As best shown in FIG. 17, panel 60 may include receiver channel 92 on each side 66, 68, which is similar to receiver channel 20 of the first embodiment. Accordingly, rigid insert 22 may be disposed in each receiver channel 92, and provides support to panel 60, reduces flexibility of panel 60, and joins adjacent panels 60 disposed side-by-side. Receiver channel 92 may have dimensions similar to those of receiver channel 20 described above. However, it should be understood that the precise dimension of receiver channel 92 may vary depending on the dimensions of rigid insert 22. For example, it may be desirable for some applications to provide a relatively thick rigid insert 22 for additional support.

Figure 26:
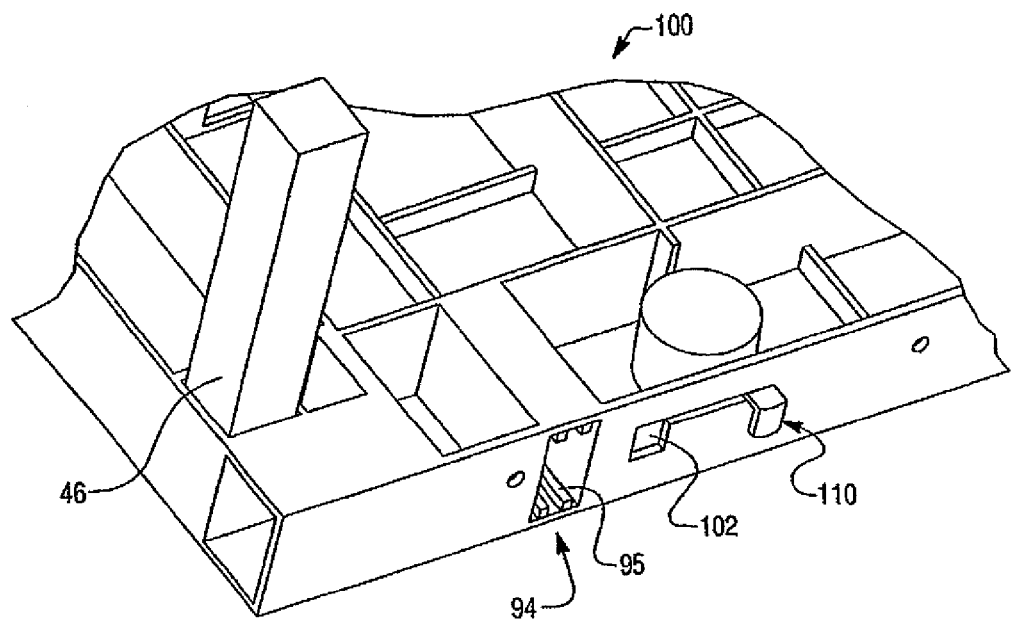
FIG. 26 is a fragmentary perspective view of a corner of the panel according to the second embodiment viewed from the bottom.

As best shown in FIG. 17, panel 60 may also include a pair of spaced-apart slots 94 formed on the respective first and second sides, 66, 68. Slots 94 may be configured for receiving brace 36, as described above, extending from first side 66 to second side 68. Alternatively, each-slot 94 may form a pocket for receiving a shorter brace or bar, such as a length of rectangular metal tubing 1 inch×2 inch, preferably 11 gauge. For example, each slot 94 may have a depth of about 2¾ inches. Slots 94 may also include sizing bars 95 disposed within each slot 94, between which the brace may be disposed, as best shown in FIG. 26. The brace is received in slots 94, and extends perpendicularly outwardly from the respective first and second sides 66, 68. Braces are received in corresponding slots 94 in the respective first side 66 and second side 68 of aligned, adjacent panels 60. Braces 36 provide additional support to each panel 60 and minimize movement between joined panels 60. Each brace 36 may be fastened within the respective slot 94 using fasteners, which are inserted through corresponding bores 96 disposed on top surface 74, as best shown in FIG. 19.

Figure 27:
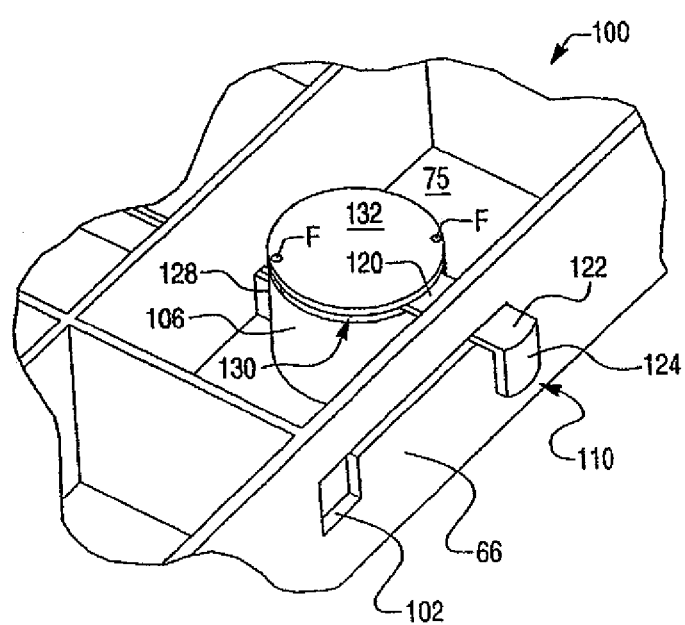
FIG. 27 is a fragmentary perspective view of the panel according to the second embodiment showing a cam lock assembly.

Panel 60 also preferably includes at least one cam lock assembly 100 disposed proximate first side 66, as best shown in FIGS. 26 and 27. A cam slot 102 is disposed on first side 66. Cam slot 102 is preferably L-shaped. A cam chamber 104 is formed on bottom surface 75 adjacent cam slot 102. Cam chamber 104 preferably has a cylindrical configuration, with sides 106 and a base 108. Cam chamber 104 is configured for receiving a cam lock 110.

Figure 28:
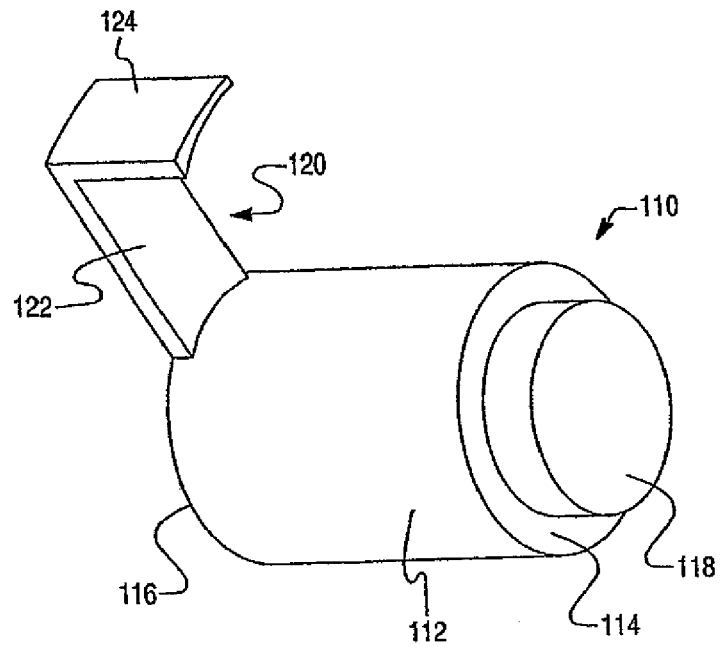
FIG. 28 is a perspective view of a cam lock according to the present invention.
Figure 29:
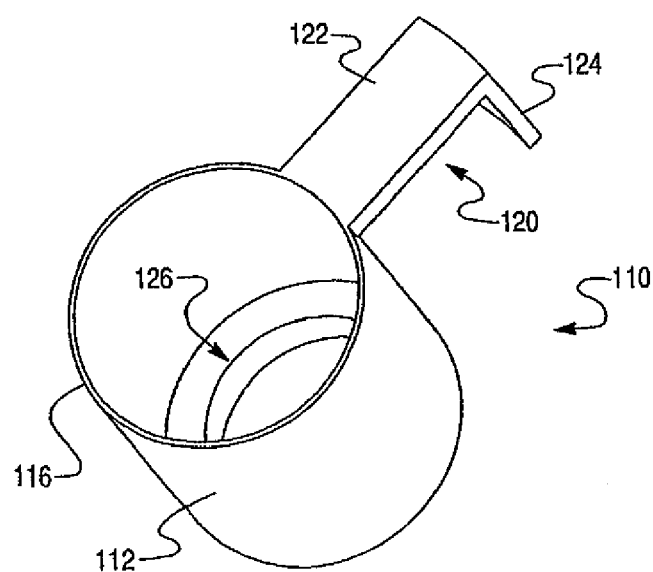
FIG. 29 is another perspective view of the cam lock shown in FIG. 28.

As best shown in FIGS. 28 and 29, cam lock 110 includes a cylindrical body 112 having first and second ends 114, 116, respectively. A head portion 118 extends outwardly from first end 114. Preferably, head portion 118 has a substantially cylindrical configuration, and is axially aligned with body 112. Head portion 118 preferably has a diameter less than the diameter of body 112. An L-shaped arm 120 having first and second legs 122, 124 extends outwardly from second end 116. First leg 122 extends outwardly from and preferably substantially perpendicular to second end 116. Second leg 124 extends outwardly from a free end of first leg 122, and preferably substantially perpendicular to first leg 122. Second leg 124 is preferably arcuate, though it may also be substantially planar. Preferably, body 112, head portion 118 and arm 120 are integrally formed from a polymer material. Preferably, body 112 is hollow, with an axially aligned bore 126 extending into second end 116, as best shown in FIG. 29. The hollow configuration of cam lock 110 limits the amount of material required for manufacture, thereby reducing costs. In addition, if cam lock 110 is formed from a molded polymer material, molding and cooling time are decreased with the hollow configuration, which also reduces manufacturing costs. Of course, cam lock 110 may also be solid, or include other openings.

Cam lock 110 is received in cam chamber 104, as best shown in FIGS. 26 and 27. Preferably, base 108 of cam chamber 104 is configured for receiving first end 114 with head portion 118 therein. An outermost edge 128 of sidewall 106 preferably includes a notch 130 extending into sidewall 106 along a portion of edge 128, as best shown in FIG. 27. Cam lock 110 is received in chamber 104, with head portion 118 adjacent base 108. Arm 120 is received within notch 130, and extends outwardly therefrom. Arm 120 is rotatable along notch 130, preferably at least about 90°, and may be swiveled so that a portion of first leg 122 and second leg 124 pass through cam slot 102 on first side 66.

A cap 132 may be secured to outermost edge 128 of sidewall 106 using fasteners F, pins, adhesive, or the like. Cap 132 thereby closes off cam chamber 104 after cam lock 110 is disposed therein. However, notch 130 is not closed off by cap 132, and thus arm 120 is allowed to move along notch 130. Cap 132 secures cam lock 110 within chamber 104, and minimizes the possibility of debris entering chamber 104 or bore 126 of cam lock 110.

Figure 30:
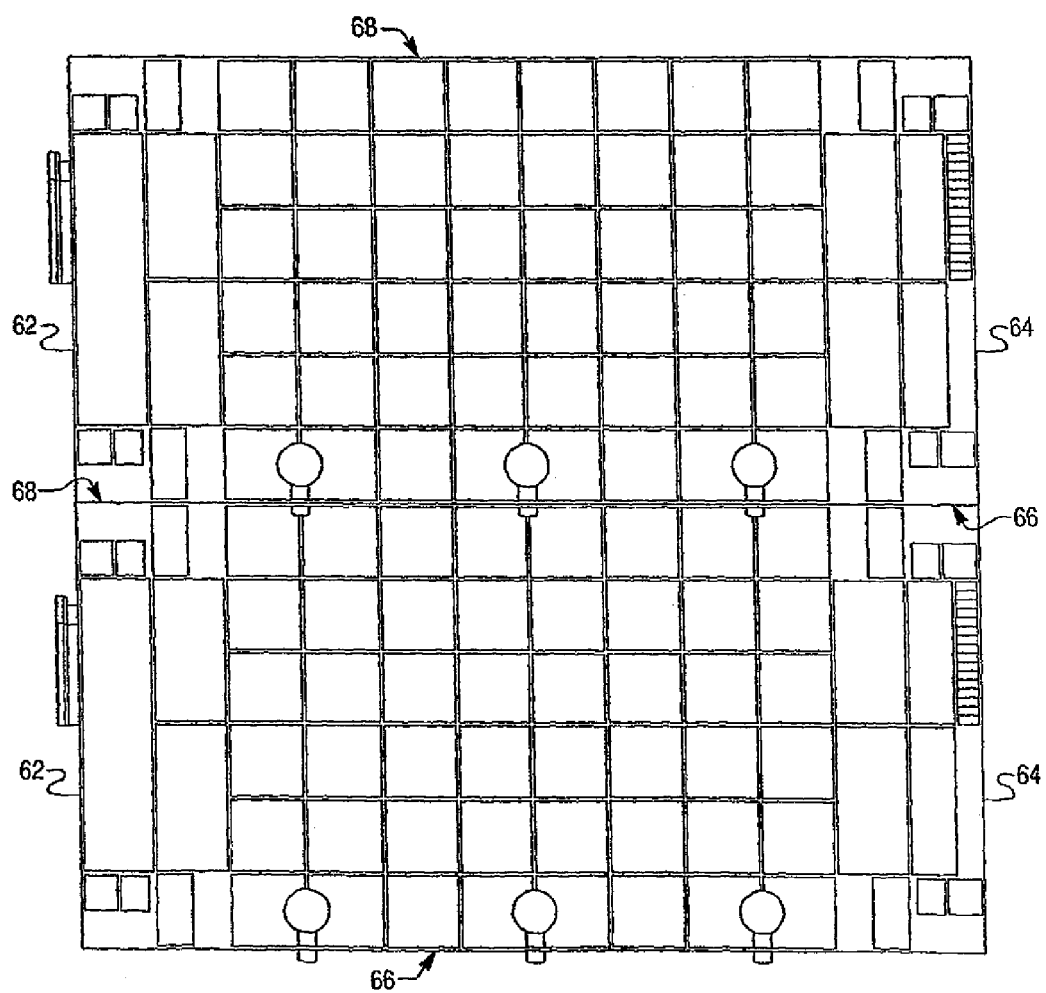
FIG. 30 is a bottom plan view of two panels joined together by the cam lock assemblies.

Second side 68 of panel 60 also includes cam slot 102, as best shown in FIG. 18. Cam lock 110 is pivotally disposed in chamber 104 so that second leg 124 may be moved through cam slot 102 on first side 66 of one panel 60 and through slot 102 on second side 68 of an adjacently disposed panel 60. Thus, the two panels 60 may be secured together by cam lock 110, as best shown in FIG. 30. Preferably, each panel 60 includes a plurality of spaced cam lock assemblies 100 along first side 66 and corresponding cam slots 102 along second side 68, as best shown in FIGS. 17-20 and 30. For example, each panel 60 may include three spaced cam assemblies 100 proximate first side 66.

Abutting sides 66, 68 of adjacently disposed panels 60 may also be secured together using a plurality of fasteners, as described above. Bolt holes 133 may be formed along sides 66 and 68, as best shown in FIG. 17. When panels 60 are abutting in a side-by-side relation, bolts and fasteners 50 may be received in the bolt holes 133 to further secure panels 60 to one another (similar to sides 16, 18 shown in FIG. 15), which minimizes the possibility of any movement between the joined panels 60.

Panel 60 preferably includes a well 134 formed in bottom surface 75 proximate each corner C, as best shown in FIGS. 18 and 20. Well 134 is similar to well 44 described above, and is configured for receiving a leg 46 for supporting panel 60 at a desired height above the surface on which panel 60 is set up, as best shown in FIG. 26. Leg 46 may be a section of tubular metal stock. An opening may extend through first and second ends 66, 68 into the respective well 134, through which a pin may be inserted. When leg 46 is disposed within well 134, the pin is received in an associated hole in leg 46, thereby locking leg 46 at a desired extension from well 134.

Panel 60 may also include an opening 136 formed proximate each corner C of first and second ends 66, 68, as best shown in FIGS. 17 and 18. A connecting bar, such as tubular metal stock (not shown), may be inserted into aligned openings 136 of two panels 60 abutting each other in an end-to-end fashion. Alternatively, connectors 54 may be disposed in openings 136 of panels abutting each other in a side-to-side fashion, as described above.

The present invention has been described with reference to various embodiments for purposes of explanation only. However, it should be understood that features of one embodiment may be incorporated into another embodiment. In addition, any preferred dimensions are exemplary, and the present invention is not so limited. Thus, it will be apparent to one of ordinary skill in the art that various modifications and variations can be made in construction or configuration of the present invention without departing from the scope or spirit of the invention. It is intended that the present invention cover such modifications and variations, and as may be applied to the central features set forth above, provided they come within the scope of the following claims and their equivalents.

We claim:

1. A flooring assembly, comprising:
    at least three rectangular sections, each of said sections including a first locking mechanism on opposite ends thereof and a second locking mechanism on opposite sides thereof;
    wherein said first locking mechanism comprises:
        a male component extending outwardly from a first end of each of said sections, said male component having a stem attached to said first end and a flange attached to a distal end of said stem, said stem having a width less than a width of said flange;
        an elongated cavity disposed in a second end of each of said sections;
        a pocket formed in an end of said cavity;
        an opening disposed on said second end of each of said sections, said opening extending into said cavity, said flange of one of said sections receivable in said cavity of another of said sections through said opening when said sides of said sections are offset so that said first end of one of said sections abuts and is parallel to said second end of the other of said sections, and a tip of said flange is laterally slidable from said cavity into said pocket as said abutting ends laterally slide against each other until said sides of said sections are aligned, thereby detachably securing said abutting ends of said sections; and
    wherein said second locking mechanism comprises:
        a first slot disposed on a first side of each of said sections, said first slot extending into a cam chamber;
        a second slot disposed on a second side of each of said sections;
        a cylindrical cam lock disposed within said cam chamber, a portion of said cam lock rotatably moveable through said first slot of one of said sections and into and securable within said second slot of another of said sections when said sides of said sections are abutting each other, thereby detachably securing said abutting sides of said sections.

2. The flooring assembly of claim 1, further comprising:
    a pair of spaced slots formed in the respective first and second sides of each of said sections, each of said slots extending substantially perpendicular to the respective first and second sides,
    a brace having a first portion and a second portion, said first portion receivable in said slot formed in said first side of one of said sections and said second portion receivable in said slot formed in said second side of another adjacently disposed and abutting section.

3. The flooring assembly of claim 2, wherein said brace is a rectangular metal bar.

4. The flooring assembly of claim 1, wherein said male component is T-shaped in cross-section.

5. The flooring assembly of claim 1, wherein said tip of said flange includes angled sides.

6. The flooring assembly of claim 5, wherein said pocket includes angled walls complimentarily configured to said angled sides of said tip so that said tip fits snugly within said pocket.

7. The flooring assembly of claim 1, wherein said cavity includes a plurality of spaced ridges, said flange laterally slidable against said ridges.

8. The flooring assembly of claim 1, wherein each of said sections includes a top surface and a bottom surface, said top surface being substantially planar.

9. The flooring assembly of claim 8, wherein said bottom surface includes a plurality of support struts, said ends and said sides having a first height, and said support struts having a second height no greater than said first height.

10. The flooring assembly of claim 9, wherein said support struts form one of a honeycomb pattern and a grid pattern.

11. The flooring assembly of claim 8, further comprising a well formed in each corner of said bottom surface.

12. The flooring assembly of claim 11, further comprising a plurality of legs, each of said legs receivable in a corresponding one of said wells.

13. The flooring assembly of claim 1, wherein each of said sections includes at least two of said cam locks and corresponding chambers and slots.

14. The flooring assembly of claim 1, wherein said sections are formed from a material selected from the group consisting of a high performance thermoplastic (HTP) structural foam resin, a fiberglass reinforced polymer composite, and a lightweight metal.

15. The flooring assembly of claim 1, wherein each of said sections further comprises a rigid insert extending outwardly from said first side thereof, and a receiver channel extending into said second side thereof, said rigid insert of one of said sections received in said receiver channel of an adjacently disposed and abutting another of said sections.

* * * * *